US010920093B2

(12) United States Patent
Ryu

(10) Patent No.: US 10,920,093 B2
(45) Date of Patent: Feb. 16, 2021

(54) COATING COMPOSITION FOR PREVENTING ADHESION OF ADVERTISING MATERIAL AND METHOD FOR COATING BY THEREOF

(71) Applicant: SHINDODNT LTD., Seoul (KR)

(72) Inventor: Young-ok Ryu, Seoul (KR)

(73) Assignee: SINDO DNT CO., LTD.

( * ) Notice: Subject to any disclaimer, the term of this patent is extended or adjusted under 35 U.S.C. 154(b) by 168 days.

(21) Appl. No.: 15/318,354

(22) PCT Filed: May 14, 2015

(86) PCT No.: PCT/KR2015/004844
§ 371 (c)(1),
(2) Date: Dec. 12, 2016

(87) PCT Pub. No.: WO2016/035973
PCT Pub. Date: Mar. 10, 2016

(65) Prior Publication Data
US 2017/0166751 A1 Jun. 15, 2017

(30) Foreign Application Priority Data

Sep. 3, 2014 (KR) .................. 10-2014-0116975

(51) Int. Cl.
*C09D 5/22* (2006.01)
*C09D 7/40* (2018.01)
(Continued)

(52) U.S. Cl.
CPC .............. *C09D 5/22* (2013.01); *B05D 1/02* (2013.01); *B05D 3/007* (2013.01); *C09D 5/00* (2013.01);
(Continued)

(58) Field of Classification Search
None
See application file for complete search history.

(56) References Cited

U.S. PATENT DOCUMENTS

| 2004/0067329 | A1 | 4/2004 | Okuyama | B32B 27/08 |
| 2004/0202850 | A1* | 10/2004 | Hayashi | B32B 27/08 |
| | | | | 428/212 |

(Continued)

FOREIGN PATENT DOCUMENTS

| CN | 105517799 | 4/2016 | B32B 27/06 |
| CN | 105518081 | 4/2016 | B32D 1/02 |

(Continued)

OTHER PUBLICATIONS

International Search Report and Written Opinion (w/translation) issued in application No. PCT/KR2015/004844, dated Jul. 15, 2015 (26 pgs).

(Continued)

*Primary Examiner* — Michael P. Rodriguez
(74) *Attorney, Agent, or Firm* — . Hayes Soloway P.C.

(57) ABSTRACT

The coating composition and coating method employs a coating composition which is coated on installations to form a coating layer, wherein the coating composition comprises: 25 to 35 parts by weight of urethane synthetic resin, acrylic resin, or epoxy resin solution; 5 to 35 parts by weight of urethane, acrylic or epoxy pigments; 10 to 20 parts by weight of PE-thermoplastic resin, phenol resin, melamine resin, epoxy resin, polystyrene resin or glass beads; 40 to 52 parts by weight of organic solvents comprising urethane thinner and toluene; and 2 to 4 parts by weight of curing agent. The coating sheet can be attached to public or private installation, such as walls, poles, street lights, or traffic lights, to prevent adhesion of unlawful advertising materials on the installation, and can be provided with color tones (Continued)

MagnificationX25

Magnification X250

Magnification X500

Magnification X750 same as those of the private or public installations in order not to defile the appearance of the street.

9 Claims, 1 Drawing Sheet

(51) Int. Cl.
    *C09D 7/65*     (2018.01)
    *C09D 7/41*     (2018.01)
    *C09D 125/06*     (2006.01)
    *C09D 5/00*     (2006.01)
    *B05D 1/02*     (2006.01)
    *B05D 3/00*     (2006.01)
    *C09D 157/06*     (2006.01)
    *C09D 163/00*     (2006.01)
    *C09D 175/04*     (2006.01)
    *C08L 75/04*     (2006.01)
    *C08L 63/00*     (2006.01)
    *C08L 33/04*     (2006.01)
    *C08K 3/40*     (2006.01)
    *B05D 7/00*     (2006.01)
    *B05D 7/02*     (2006.01)
    *B05D 5/08*     (2006.01)
    *C08L 61/28*     (2006.01)
    *C08L 61/06*     (2006.01)

(52) U.S. Cl.
    CPC ................ *C09D 7/40* (2018.01); *C09D 7/41* (2018.01); *C09D 7/65* (2018.01); *C09D 7/69* (2018.01); *C09D 125/06* (2013.01); *C09D 157/06* (2013.01); *C09D 163/00* (2013.01); *C09D 175/04* (2013.01); *B05D 5/08* (2013.01); *B05D 7/02* (2013.01); *B05D 7/546* (2013.01); *C08K 3/40* (2013.01); *C08L 33/04* (2013.01); *C08L 61/06* (2013.01); *C08L 61/28* (2013.01); *C08L 63/00* (2013.01); *C08L 75/04* (2013.01)

(56) References Cited

U.S. PATENT DOCUMENTS

| | | | | |
|---|---|---|---|---|
| 2004/0226717 | A1* | 11/2004 | Reddy | C09K 8/44 166/295 |
| 2017/0166751 | A1 | 6/2017 | Ryu | C09D 5/00 |
| 2017/0166783 | A1 | 6/2017 | Ryu | C09D 5/00 |

FOREIGN PATENT DOCUMENTS

| | | | | |
|---|---|---|---|---|
| KR | 200367098 | | 11/2004 | ............ B32B 15/08 |
| KR | 200367098 | Y1 * | 11/2004 | |
| KR | 20050051590 | | 6/2005 | ............ G09F 19/22 |
| KR | 20050051590 | A * | 6/2005 | |
| KR | 100513825 | | 9/2005 | ......... C09D 139/02 |
| KR | 200403641 | | 12/2005 | ............ B32B 27/08 |
| KR | 200411629 | | 3/2006 | ............ G09F 15/00 |
| KR | 100771856 | | 11/2007 | ........... C09D 175/00 |
| KR | 20080062638 | | 7/2008 | ............ B32B 27/06 |
| KR | 100856868 | | 9/2008 | ............ B32B 27/06 |
| KR | 101016072 | | 2/2011 | ............ B32B 15/08 |
| KR | 101057499 | | 8/2011 | ............ B08B 17/02 |
| KR | 101260262 | | 5/2013 | ............ B32B 27/08 |
| KR | 101260262 | B1 * | 5/2013 | |
| KR | 101412870 | | 6/2014 | ........... C09D 131/04 |
| KR | 101517877 | | 5/2015 | ............ B32B 27/06 |
| KR | 101517878 | | 5/2015 | ............... B05D 1/02 |
| WO | WO 2016035972 | | 3/2016 | ............ B32B 27/26 |
| WO | WO 2016035973 | | 3/2016 | ............... C09D 7/12 |

OTHER PUBLICATIONS

U.S. Appl. No. 15/318,355, filed Dec. 12, 2016, Ryu.
International Search Report and Written Opinion (w/translation) issued in application No. PCT/KR2015/004843, dated Aug. 7, 2015 (23 pgs).
Canadian Official Action for related Canadian Patent Application Serial No. 2,951,518, dated Mar. 14, 2018 (4 pages).
Canadian Official Action for related Canadian Patent Application Serial No. 2,951,520, dated Mar. 15, 2018 (3 pages).

* cited by examiner

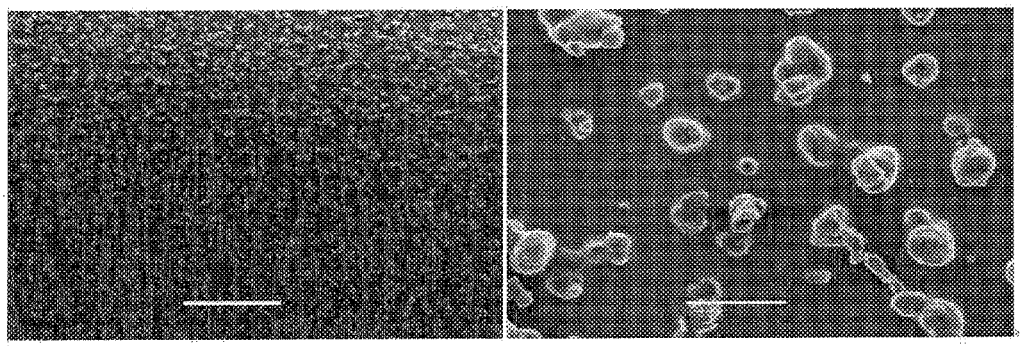
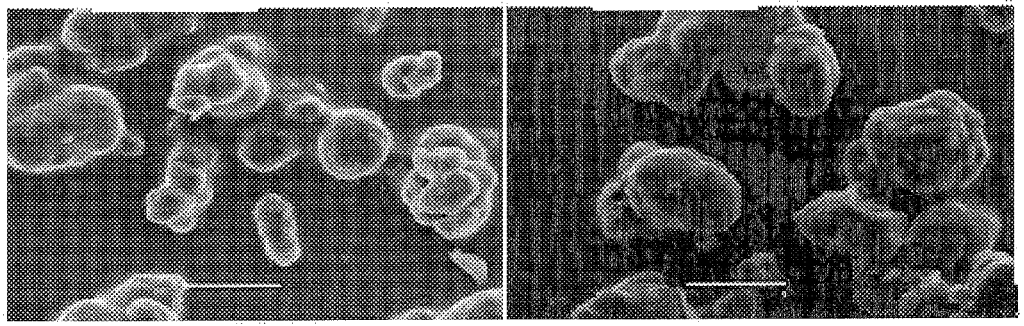

COATING COMPOSITION FOR PREVENTING ADHESION OF ADVERTISING MATERIAL AND METHOD FOR COATING BY THEREOF

FIELD OF THE INVENTION

The present invention relates to a coating composition and a method for coating using the same, and more particularly, the present invention relates to a coating composition and a method for coating using the same for preventing adhesion of advertising materials by being coated on public or private facilities, such as walls, poles, street lights, or traffic lights, for the purpose of preventing attachment of unlawful advertising materials.

BACKGROUND ART

Generally, the poles for street lamps, road signs, traffic signals, and power transmission are installed at places having very good visibility. Accordingly, they attract attachment of unlawful advertisement materials.

Other road facilities installed at highly-visible locations further include fences and breast walls, which are also exposed to adhesion of unlawful advertising materials.

Unlawful advertising materials are one of the major sources which deteriorate urban environment. The leaflets and posters posted on various private and public facilities without due authorization defile the appearance of the street, especially, those attached on the surface or posts of traffic signs can be a cause of traffic accident by distracting drivers from driving or deteriorating the communication capacity of the traffic signs.

In the mean time, many local governments are operating a dedicated team for removing such unlawful advertising materials on a continuous basis, however, fail to provide a fundamental solution due to high cost.

To this end, plates or sheets which can prevent unlawful advertising materials from being attached on street lights, road signs, and traffic signals installed along on the roads are suggested.

Examples of the sheets for preventing unlawful advertising materials include a sheet made of rubber or a synthetic resin, formed with conical, quadrangular pyramidal, or similar projections on one surface, and the sheet wraps around a post of street light, road sign or traffic light and fastened with one or more additional bands.

However, this configuration requires additional bands and fasteners to fix the sheet, and defiles the appearance of the street with the exposed bands and fasteners, not mentioning the structural complexity.

LISTING OF PRIOR ART REFERENCES

Prior Technical Reference

Patent Reference (Patent Reference 1) Korean Registered Patent No. 10-1412870 (registered on Jun. 20, 2014)

(Patent Reference 2) Korean Registered Utility Model No. 20-0411629 (registered on Mar. 9, 2006)

(Patent Reference 3) Korean Registered Patent No. 10-0513825 (registered on Sep. 1, 2005).

DETAILED DESCRIPTION OF THE INVENTION

Technical Objects

An aspect of the present invention is to provide a coating composition which is coated on public or private facilities, such as walls, poles, street lights, or traffic lights for preventing adhesion of unlawful advertising materials on the facilities, and a coating method using the same.

Another aspect of the present invention is to provide a coating composition and a method for coating using the same for preventing adhesion of unlawful advertising materials by being coated on the surface of installations or printed materials to reduce adhesiveness. In addition, the coating sheet in accordance with the present invention enables removal of advertising materials attached with adhesives without using a special tool, such as a scrapper, and without residual adhesives.

Still another aspect of the present invention is to provide a coating composition and a method for coating using the same for preventing adhesion of unlawful advertising materials, the sheet having electrical insulating power to prevent electric shock by leakage current for safe application to electrical installations such as street lights and traffic lights.

Still another aspect of the present invention is to provide a coating composition and a method for coating using the same for preventing adhesion of unlawful advertising materials, where the composition and method do not defile the appearance of the street by using pigments of the same color of the private or public installations.

The invention is not restricted to the embodiments set forth herein. The above and other aspects of the invention will become apparent to those skilled in the art to which the invention pertains by referencing the detailed description of the invention below.

Technical Solution

The coating composition in accordance with the present invention for preventing adhesion of advertising materials comprises a coating composition which is coated on installations to form a coating layer, wherein the coating composition comprises: 25 to 35 parts by weight of urethane synthetic resin solution, acrylic resin solution, or epoxy resin solution; 5 to 35 parts by weight of urethane pigments, acrylic or epoxy pigments; 10 to 20 parts by weight of PE-thermoplastic resin beads, phenol resin beads, melamine resin beads, epoxy resin beads, polystyrene resin beads or glass beads; 40 to 52 parts by weight of organic solvents comprising urethane thinner and toluene; and 2 to 4 parts by weight of curing agent.

The urethane pigment, acrylic or epoxy pigment can be transparent or colored.

The curing agent can be isocyanate TDI (toluene di-iso cyanate), MDI (methylene diphenyl di-isocyanate) urethane synthetic resin, diethylenetriamine (DETA), TET (Tetramethylthiurammonosulfide), acrylic, or epoxy curing agent.

The coating composition can further comprise a silica curing agent.

The silica curing agent can be added by from 4 to 8 parts by weight.

The coating composition can further comprise fine particles of luminous paint which can be included by 10 to 15 unit weight per 100 unit weight of the coating composition.

The average diameter of the luminous paint particles can be between from about 50 to about 250 μm.

The coating composition can further comprise silicone oil, paraffin oil, terrapin oil, or petrol oil.

The coating composition can further comprise a second coating composition coated on the coating layer, and the second coating composition can comprise 8 to 12 parts by weight of silicon release agent, 40 to 55 parts by weight of hexane, 20 to 25 parts by weight of toluene, and 0.08 to 0.18 parts by weight of platinum catalyst.

The second coating composition can further comprise silicone oil, paraffin oil, terrapin oil, or petrol oil.

The second coating composition can be added with a mixture of the platinum catalyst and acetic acid type silicone or non-acetic acid type silicone.

In addition, the coating method using the coating composition for preventing adhesion of advertising materials in accordance with the present invention comprises the steps of: coating and drying a first coating composition on an installation; and coating and drying a second coating composition on the coating layer formed with the dried first coating composition, wherein the first coating composition comprises 25 to 35 parts by weight of urethane resin solution, acrylic resin solution, or epoxy resin solution, 5 to 35 parts by weight of urethane pigment, acrylic pigment, or epoxy pigment, 10 to 20 parts by weight of PE-thermoplastic resin beads, phenol resin beads, melamine resin beads, epoxy resin beads, polystyrene resin beads or glass beads having a diameter ranging between from 10 to 500 (μm), 40 to 52 parts by weight of urethane thinner and toluene, and 2 to 4 parts by weight of curing agent which can be isocyanate TDI (toluene di-iso cyanate), MDI (methylene diphenyl di-isocyanate) urethane synthetic resin, diethylenetriamine (DETA), TET (Tetramethylthiurammonosulfide), acrylic, or epoxy curing agent, and the second coating composition comprises 8 to 12 parts by weight of silicone release agent, 40 to 55 parts by weight of hexane, 20 to 25 parts by weight of toluene, and 0.08 to 0.18 parts by weight of platinum catalyst.

The step of coating and drying the first coating composition or the second coating composition can be air spray coating or roller coating followed by drying.

The urethane pigment, acrylic or epoxy pigment can be transparent or colored.

The first coating composition can further comprise a silica curing agent.

The first coating composition can further comprise fine particles of luminous paint which can be included by 10 to 15 unit weight per 100 unit weight of the first coating composition, and the average diameter of the luminous paint particles can be between from about 50 to 250 μm.

The second coating composition can be added with a mixture of the platinum catalyst and acetic acid type silicone or non-acetic acid type silicone.

Effects of the Invention

The present invention can be coated on public or private installations, such as walls, poles, street lights, or traffic lights, to prevent adhesion of unlawful advertising materials on the installation.

In addition, the present invention enables removal of advertising materials attached with adhesives without using a special tool, such as a scrapper, and without residual adhesives, by being coated on the surface of installations or printed materials to reduce adhesive strength.

In addition, the present invention can be provided with electrical insulation property to prevent electric shock caused by leakage current for safe application to electrical installations such as street lights and traffic lights.

In addition, the present invention can be provided with color tones same as those of the private or public installations in order not to defile the appearance of the street.

It will be apparent for those skilled in the art that the embodiments in accordance with the present invention can provide various effects not described in further details.

BRIEF DESCRIPTION OF THE DRAWINGS

FIG. 1 is a picture of the small projections formed on the first coating layer of the coating composition for preventing adhesion of advertising materials in accordance with the present invention, obtained by scanning electron microscopy (SEM).

DESCRIPTION OF THE PREFERRED EMBODIMENT OF THE INVENTION

The advantages and characteristic features, and the method for achieving the advantages of the present invention will be clarified by the embodiments described in details and the attachment drawing, hereinbelow. However, the present invention is not limited to the embodiments provided here but can be implemented in various ways. Rather, the embodiments set forth and described hereinafter are provided to help the present invention to be understood easily and clearly, and to provide the persons skilled in the art with sufficient information related with the present invention. In the drawings, the thicknesses of the layers and regions are exaggerated for clear visibility.

The terms such as top, bottom, upper surface, lower surface, or upper portion and lower portion are used in this description to specify relative positions of the components. For example, to designate the upper and lower portions of a drawing as the upper and lower portions, respectively, the upper portion and the lower portion of the drawing may be designated as the lower portion and the upper portion, respectively, without departing from the scope of the present invention.

The terms used in this description are adopted only to describe the specific embodiment, and are not intended to limit the scope of the present invention. The singular nouns in this description shall represent plural nouns unless singular and plural can be distinguished clearly according to the context. In this description, the terms "comprise" or "comprised of" are used with the intension to express that the characteristics, figures, steps, motions, components, parts, or the combinations thereof exist, but should be interpreted that they do not to eliminate the existence or additional possibilities of one or more different characteristics, figures, steps, motions, components, parts or the combinations thereof.

Unless otherwise defined herein, the terms including the scientific terms used in this description shall bear the meanings that are generally understood by those skilled in the art. The terms bearing the meanings as defined in common dictionaries shall be interpreted as the meanings in the context of the art, and shall not be interpreted in an ideal or excessively formal meaning unless otherwise defined in this description clearly.

Preferable embodiments of the coating composition for preventing adhesion of advertising materials in accordance with the technical spirit of the present invention are described hereinbelow in further detail referring to the accompanying drawings.

FIG. 1 is a picture of the small projections formed on the first coating layer of the coating composition for preventing adhesion of advertising materials in accordance with the present invention, obtained by scanning electron microscopy (SEM).

The coating composition in accordance with the present invention can be coated on public or private installations, such as walls, poles, street lights, or traffic lights, to prevent adhesion of unlawful advertising materials on the installation. In the present invention, the advertising materials include leaflets, stickers and other bills posted on outdoor installations using adhesives.

Referring to FIG. 1, the coating composition for preventing adhesion of advertising materials in accordance with the present invention comprises a first coating composition and a second coating composition.

The first coating composition can be coated on public or private installations, such as walls, poles, street lights, or traffic lights, to prevent adhesion of unlawful advertising materials on the installation. The first coating composition, when coated on private or public installations, forms very small irregularities on the dried surface to allow easy removal of advertising materials attached on the coating sheet in accordance with the present invention without using a mechanical means such as a scrapper. The first coating composition can be coated on public or private installations such as walls, poles, street lights and traffic lights by air spraying or roller coating method. The public or private installations may be made of a material having a soft surface, for example, PVC, or metallic materials.

The first coating composition may comprise: 25 to 35 parts by weight of urethane resin solution, acrylic resin solution, or epoxy resin solution; 5 to 35 parts by weight of urethane pigment, acryl pigment or epoxy pigment, 10 to 20 parts by weight of PE-thermoplastic resin beads, phenol resin beads, melamine resin beads, epoxy resin beads, polystyrene resin beads or glass beads having a wide range of diameters between from 10 to 500 μm; 40 to 52 parts by weight of urethane thinner and toluene; and 2 to 4 parts by weight of curing agent for increasing hardness or promoting hardening. The curing agent can be isocyanate TDI (toluene di-iso cyanate), MDI (methylene diphenyl di-isocyanate) urethane synthetic resin, diethylenetriamine (DETA), TET (Tetramethylthiurammonosulfide), acrylic, or epoxy curing agent.

In addition, the urethane pigment, acryl pigment or epoxy pigment can be transparent or have various colors so that a desirable color can be selected and used to match the color of the private or public installations in order not to defile the appearance of the street.

Of the coating compositions in accordance with the present invention for preventing adhesion of advertising materials, the first coating composition can further comprise a silica curing agent. The silica curing agent used in cold seasons can be added to reduce curing time and drying time of the composition of the first coating layer at an ambient temperature between from −1 to −20 degrees Celsius. For the purpose of the present invention, the silica curing agent can be added by from 4 to 8 parts by weight.

In addition, the first coating composition can further comprise fine particles of luminous paint. The luminous paint particles are added to enhance visibility of the installations at night by reflecting light. The particle size ranges from between 50 to 250 μm and the concentration ranges from between 10 to 15 unit weight per 100 unit weight of the first coating composition. In the present invention, the luminous paint particles can be zinc sulfide containing copper added with radium or alkaline earth metal sulfide or zinc sulfide added with a heavy metal. In the present invention, the small irregularity formed on the cured coating layer of the first coating composition and the light reflected by the luminous paint particles improve releasability and visibility of installations.

The second coating composition is coated on the cured surface of the first coating composition to further improve the releasability of the first coating composition. The second coating composition can be applied onto the coating layer of the first coating composition by air spraying or roller coating method, can be formed in a thin film shape to improve releasability, and can prevent adhesion of the adhesive of advertising materials.

The second coating composition can comprise 8 to 12 parts by weight of silicon release agent, 40 to 55 parts by weight of hexane as a diluting solvent, 20 to 25 parts by weight of toluene, and 0.08 to 0.18 parts by weight of platinum catalyst to promote curing.

In the present invention, the second coating composition can further comprise acetic acid type silicone or non-acetic acid type silicone to promote curing. In an embodiment of the present invention, platinum catalyst is used to promote curing, and in addition, a mixture of platinum catalyst and acetic acid type of non-acetic acid type silicone can be used to further reduce the curing time.

Acetic acid type silicone which is a silicone based on acetic acid, has acidity and fast curing rate by 6, is low priced and highly adhesive to glass and ceramic materials. Non-acetic acid type silicone which does not contain acetic acid in the silicone provides good adhesive strength to mirrors, aluminum, wood, and stone, and its drying rate is lower than that of acetic acid type but it can provide stable adhesive strength.

The coating composition in accordance with the present invention for preventing adhesion of advertising materials comprises a first coating composition comprising PE-thermoplastic resin beads, phenol resin beads, melamine resin beads, epoxy resin beads, polystyrene resin beads or glass beads, and a second coating composition comprising a silicone release agent. Because the first coating composition and the second coating composition provide insulation property when cured, the coating layer of the coating composition in accordance with the present invention for preventing adhesion of advertising materials can prevent electric shock when applied to street lights and traffic lights.

The first coating composition and the second coating composition may further comprise an oil component to improve releasability from advertising materials.

The oil can be selectively silicone oil, paraffin oil, terrapin oil, or petrol oil, and can be added in the mixture of the first coating composition and the second coating composition to further improve releasability of the first coating composition and the second coating composition.

The coating method of the coating composition for preventing adhesion of advertising materials in accordance with the present invention is described hereinbelow in further detail referring to the accompanying drawings.

First, a user can select a public or private installation such as a wall, pole, street light or traffic light to which the coating composition in accordance with the present invention is to be applied. The public or private installation can be made of PVC, FLEX fabric, PP, PET, or other soft synthetic resins.

In the next step, the first coating composition can be coated on the selected installation. The first coating composition can comprise 25 to 35 parts by weight of urethane resin solution, acrylic resin solution, or epoxy resin solution, 5 to 35 parts by weight of urethane pigment, acrylic pigment, or epoxy pigment, 10 to 20 parts by weight of PE-thermoplastic resin beads, phenol resin beads, melamine resin beads, epoxy resin beads, polystyrene resin beads or glass beads having diameters ranging between from 10 to 500 μm, 40 to 52 parts by weight of urethane thinner and toluene, and 2 to 4 parts by weight of curing agent which can be isocyanate TDI (toluene di-iso cyanate), MDI (methylene diphenyl di-isocyanate) urethane synthetic resin, diethylenetriamine (DETA), TET (Tetramethylthiurammonosulfide), acrylic, or epoxy curing agent, can be applied onto the installation by air spraying or roller coating, and dried naturally at a temperature between from 10 to 35 degrees Celsius for one and a half hour to two and a half hour. During the curing process, the composition forms very small irregularities as shown in FIG. 1.

Here, the user may add a silica curing agent in the first coating composition in cold seasons, or add fine particles of luminous paint to enhance visibility of the installation at night by reflecting light, or add oil to improve releasability.

After forming a coating layer with the first coating composition, the second coating composition can be coated on the coating layer of the first coating composition. The second coating composition can comprise: 8 to 12 parts by weight of silicon release agent; 40 to 55 parts by weight of hexane; 20 to 25 parts by weight of toluene; and 0.08 to 0.18 parts by weight of platinum catalyst, and can be coated on the first coating layer (2) by air spraying or roller coating, and dried. The second coating composition is applied onto the coating layer formed with the first coating composition to form a thin film so that the film formed with the second coating composition can improve releasability and prevent adhesion of the adhesive of advertising materials.

In an embodiment of the present invention for the coating method using the coating composition for preventing adhesion of advertising materials in accordance with the present invention, platinum catalyst is used to reduce curing time, wherein the platinum catalyst can be added with acetic acid type or non-acetic acid type silicone to further reduce the curing time.

Here, the user can further add oil to further improve the releasability of the second coating composition. The oil can be selectively silicone oil, paraffin oil, terrapin oil, or petrol oil.

From the foregoing it is believed that those skilled in the pertinent art will recognize the meritorious advancement of this invention and will readily understand that while the present invention has been described in association with a preferred embodiment thereof, and in the accompanying drawings, numerous changes and modifications may be made therein by those skilled in the art without departing from the spirit and scope of this invention. Accordingly, the scope of the present invention is intended to embrace all such alternatives, modifications, and variations as fall within the scope of the claims, together with all equivalents thereof.

What is claimed is:

1. A coating composition for forming a coating layer which inhibits adhesion of unwanted materials, the coating composition comprising:
    25 to 35 parts by weight of urethane synthetic resin solution, acrylic resin solution, or epoxy resin solution;
    5 to 35 parts by weight of urethane pigments, acrylic or epoxy pigments;
    10 to 20 parts by weight of PE-thermoplastic resin beads, phenol resin beads, melamine resin beads, epoxy resin beads, polystyrene resin beads or glass beads;
    40 to 52 parts by weight of organic solvents comprising urethane thinner and toluene;
    2 to 4 parts by weight of curing agent; and
    particles of luminous paint comprising 10 to 15 unit weight per 100 unit weight of the coating composition, the particles of luminous paint having diameters between 50 and 250 μm,
    wherein the coating layer, on drying, has small irregularities on the dried surface, resulting in improved visibility and improved releasability of unwanted materials.

2. The coating composition of claim 1, wherein the urethane pigment, acrylic or epoxy pigment is transparent or colored.

3. The coating composition claim 1, wherein the curing agent comprises isocyanate TDI (toluene di-isocyanate), urethane synthetic resin, diethylenetriamine (DETA), TET (Tetramethylthiurammonosulfide), acrylic, or epoxy curing agent.

4. The coating composition for of claim 1, wherein the coating composition further comprises a silica curing agent.

5. The coating composition of claim 4, wherein the coating composition comprises 4 to 8 parts by weight of the silica curing agent.

6. The coating composition of claim 1, wherein the coating composition further comprises silicone oil, paraffin oil, terrapin oil, or petrol oil.

7. The coating composition of claim 1, in combination with a second coating composition to be coated on the coating layer formed by the coating composition, wherein the second coating composition comprises:
    8 to 12 parts by weight of silicon release agent,
    40 to 55 parts by weight of hexane,
    20 to 25 parts by weight of toluene, and
    0.08 to 0.18 parts by weight of platinum catalyst.

8. The coating system of claim 7, wherein the second coating composition further comprises silicone oil, paraffin oil, terrapin oil, or petrol oil.

9. The coating system of claim 7, wherein the second coating composition is added with platinum catalyst mixed with acetic acid type or non-acetic acid type silicone.

* * * * *